June 9, 1942.  C. B. GARWOOD ET AL  2,285,707
METHOD OF MAKING MULTIPLE CONTAINERS
Filed April 9, 1941   2 Sheets-Sheet 1

C. B. Garwood
W. R. Schlehr
INVENTORS.
BY *(signature)*

June 9, 1942.  C. B. GARWOOD ET AL  2,285,707
METHOD OF MAKING MULTIPLE CONTAINERS
Filed April 9, 1941  2 Sheets-Sheet 2
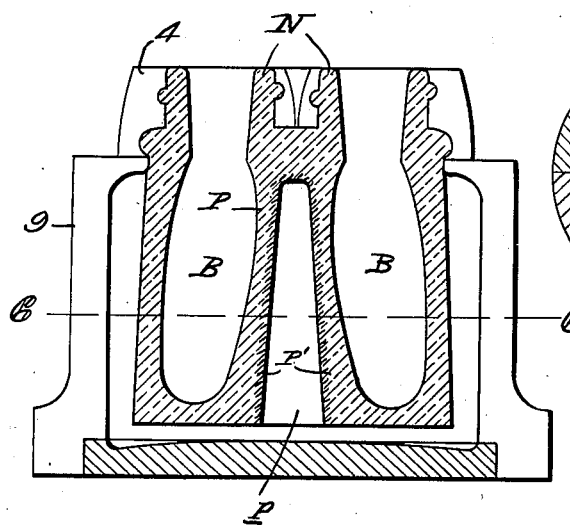
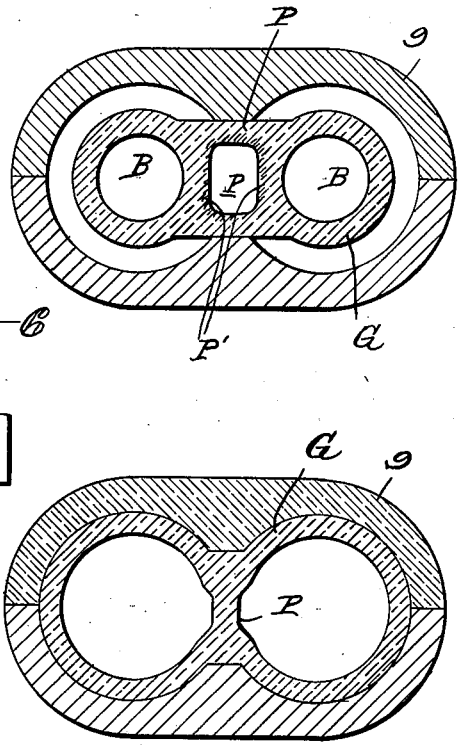
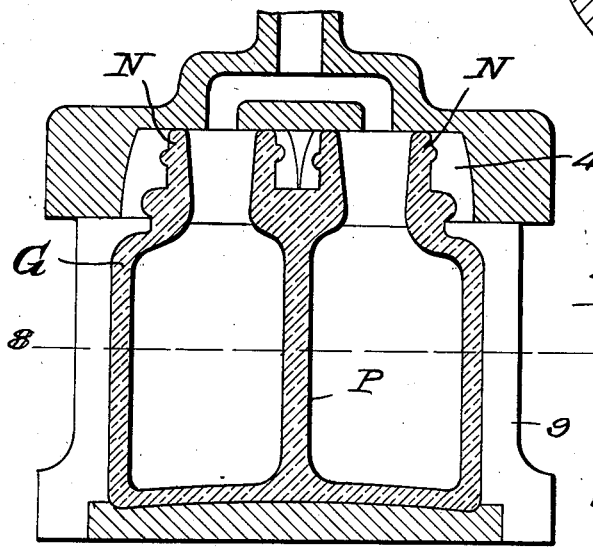
C. B. Garwood
W. R. Schlehr
INVENTORS.
BY C. A. Snow & Co.

Patented June 9, 1942

2,285,707

UNITED STATES PATENT OFFICE 2,285,707

METHOD OF MAKING MULTIPLE CONTAINERS

Charles B. Garwood, Linthicum Heights, and Walter R. Schlehr, Baltimore, Md., assignors to Carr-Lowrey Glass Co., Baltimore, Md.

Application April 9, 1941, Serial No. 387,758

8 Claims. (Cl. 49—80)

This invention relates to a new and improved method of producing multiple-compartment, one-piece containers. Heretofore the only practical method, as far as we are aware, has been the one disclosed in the patent to Garwood, No. 2,013,382, dated September 3, 1935. That method, however, has been useful in the production of small containers only because, during the final blow, it has been difficult to produce a properly centered partition in a tall container or to insure predetermined capacities for the respective cavities. This is due to several factors. The air directed through the neck openings of a bottle is not always of exactly the same pressure and one jet sometimes is delayed slightly relative to the other jet. Then, too, as the outside skin of the parison has been chilled by mold contact it is at a higher viscosity than the interior glass, especially that glass which is intended for the partition in the finished container, and which will be at the highest temperature and lowest viscosity. Consequently, this partition glass offers comparatively little resistance to movement by the blowing air and is easily displaced or perforated by the aforementioned factors and it is impossible to predict, with any degree of accuracy, the direction the metal will take when expanded in the mold. Consequently, unless the bottle is small, a number of the produced articles have heretofore been discarded as defective.

An object of the present invention is to improve upon the patented method by increasing the viscosity of the glass at predetermined points during the production of the parison whereby, during the final blow, those portions of increased viscosity will resist variations in air pressures at opposite sides thereof and assume desired predetermined positions, thereby assuring the production of separate cavities of desired capacities.

In attaining the foregoing objects a parison is first formed by dropping glass of proper volume into a parison mold having multiple neck rings, and then subjecting the glass to a momentary pressure, as by suction or a down blow, to pack it about the neck pins and produce the usual neck finish. During or immediately following the down blow, an equalizer in the form of a plate or the like is forced against the upper surface of the glass to level off and insure even distribution of the glass in the mold.

The equalizer is withdrawn from the parison mold and a baffle is moved onto the mold while a member chilled to a predetermined temperature, is positioned in the mold so as to extend into the preshaped glass and divide it into connected portions of predetermined bulk. With the parts thus positioned the neck pins are withdrawn and the glass subjected to the usual blow back so that the parison thus will be expanded within its mold, the formed bubbles being of predetermined size and shape. Those portions of the glass contacting with the chilled member will be slightly cooled thereby so as to become of increased viscosity while the remaining wall portions of the parison will retain desired fluidity.

After momentary insertion of the chilling member, it is withdrawn from the parison mold, thereby leaving a parison having separated cavities spaced apart by a hollow partition. Because of the chilling action of the inserted member, this partition acquires greater viscosity than the remaining walls of the parison. Consequently the partition will overcome any relative displacement due to gravity while supported in or being transferred to the blow mold and also resist slightly uneven or improperly timed internal pressures. Consequently when the suspended parison is subjected to the final blow, the less viscuous portions of the glass will flow to the walls and bottom of the mold after which the hollow partition will be collapsed or crushed transversely until opposed portions come into contact with each other and become unified into a solid partition properly positioned between the formed cavities.

After the removal of the formed article from the blow mold the cooling member is chilled in any suitable manner so as to be brought to the predetermined temperature prior to repeating the described operation.

For the purpose of illustrating the several steps of the method, one form of apparatus has been shown in the accompanying drawing in which Figure 1 is a section through a portion of a parison mold showing the glass after it has been subjected to the initial or down blow.

Figure 5 shows the parison in a blow mold ready to receive the final blow.

Figure 6 is a section through the parison on line 6—6, Figure 5.

Figure 7 is a section showing the finished bottle in the blow mold.

Figure 8 is a section on line 8—8, Figure 7.

Figure 1:
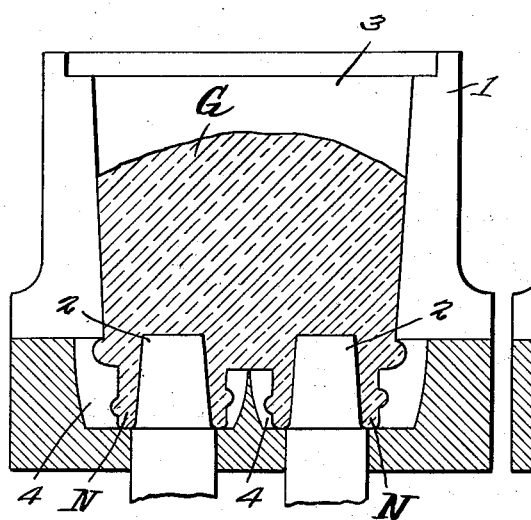
Figure 2:
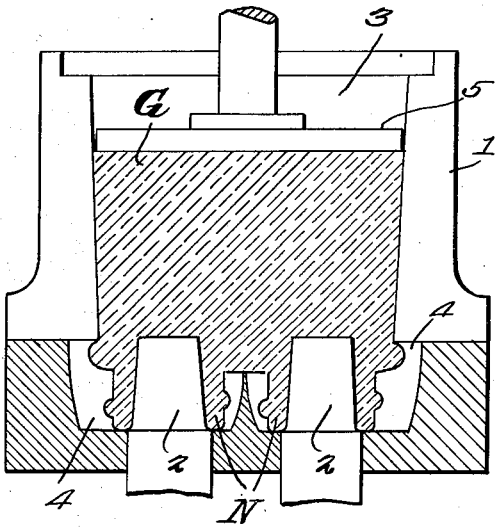
Figure 2 is a similar view showing the equalizer in position on the evenly distributed glass in the parison mold.

Referring to the figures by characters of reference, 1 is a parison mold having neck pins 2 associated therewith and extending into a single cavity 3 through neck rings 4. Following the placement of molten glass G in the mold, it is subjected to a down blow or to a suction, depending upon the type of bottle machine used, thereby producing the desired neck finishes N. The equalizer plate or plunger 5 is then pressed onto the glass to distribute and level it evenly in the mold, this action occurring either during or immediately after the down blow or suction. The equalizer is then withdrawn from the mold.

In the apparatus illustrated, a baffle 6 is normally supported outside mold 1 and has a tongue 7 depending therefrom. This tongue normally is positioned in a stream of air issuing from a nozzle 8 or is subjected to any other suitable cooling means so that the tongue can be brought to and held at a predetermined temperature.

Figure 3:
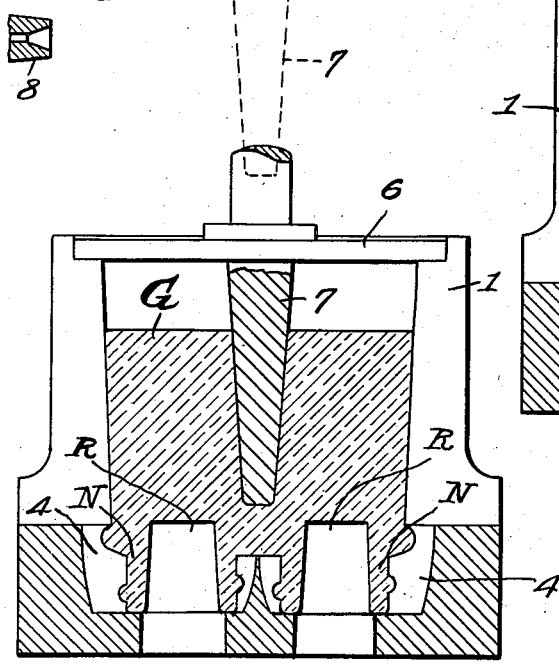
Figure 3 illustrates the third step of the method, namely, the positioning of a baffle and a cooling tongue and withdrawal of the neck pins.
Figure 4:
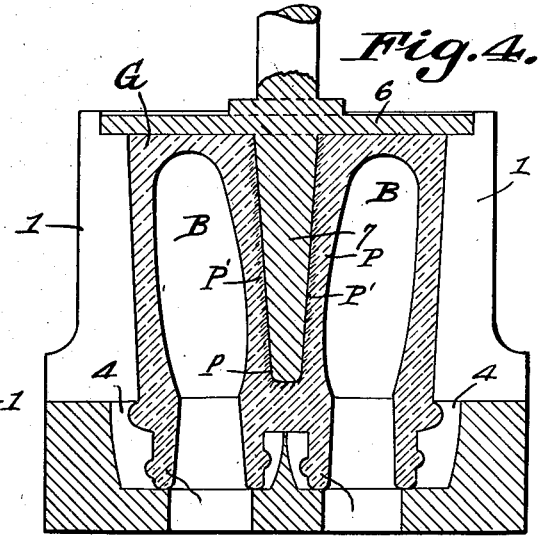
Figure 4 is a section showing the completed parison in its mold following the back blow.

Following removal of the equalizer the cooled tongue is lowered into the mold 1 and pressed into the glass G as shown in Figure 3. The neck pins 2 are withdrawn leaving recesses R and the parison is subjected to a back blow into the recesses R. This causes the glass G which has been partially separated by the tongue 7 into two portions, to expand against the baffle and mold and along tongue 7 and when the separate bubbles B are formed in the glass they will be of equal capacity.

As the tongue 7 is cooler than the mold, the contact of the glass therewith will cause the glass to become of increased viscosity along the surfaces of the tongue and as the tongue is spaced from the walls of the mold the chilled portions of the glass will form a partition P with a recess p the walls of which are chilled and become more viscous, as indicated at P'.

The baffle is withdrawn to return its tongue to position for cooling and the parison is next transferred to a blow mold 9 as in Figure 5. During and after this operation the box-like or hollow partition keeps its form due to the reenforcing action of its chilled faces.

Subsequently the parison is subjected to the final blow, the air under pressure entering through both neck portions and expanding the parison. As those portions of the parison nearest the walls of the mold are hotter and of greater fluidity than the partition P, they will be the first to shift under internal pressure, flowing against the walls and bottom of the mold. At practically the same time, although in fact a minutely short period thereafter, the opposed portions of the hollow tongue P are pressed uniformly toward each other until they are completely unified in a solid partition, as shown in Figures 7 and 8.

While the method disclosed results in the formation of two cavities of equal capacity it is to be understood that the relative capacities can be changed by changing the location of the chilling medium in the parison mold.

What is claimed is:

1. The method of producing a multiple compartment, one-piece container which includes the steps of forming a parison body having separate bubbles separated by a partition, thereafter increasing the viscosity of the partition to a degree greater than that of the walls of the body, and subsequently blowing the bubbles simultaneously in a blow mold thereby to expand the walls against the mold.

2. The method of producing a multiple compartment, one-piece container which includes the steps of forming a parison body having separate bubbles separated by a partition, thereafter forming a recess in the partition with a chilling element, thereby to increase the viscosity of the partition to a degree greater than that of the walls of the body, and subsequently blowing the bubbles simultaneously in a blow mold thereby to expand the walls against the mold and to collapse the hollow partition to unify opposed portions thereof.

3. The method of producing a multiple compartment, one-piece container which includes the steps of producing a parison having separate cavities separated by a partition, then forming a recess in the partition with a chilling element, thereby to increase the viscosity of the partition to a degree greater than that of the walls of the body, subsequently expanding against the wall of a mold those portions of the parison of greatest fluidity, and thereafter collapsing the recessed partition and unifying opposed portions thereof by pressure from within the expanded portions of the parison.

4. The method of producing a multiple compartment, one-piece container having a separate neck for each compartment, which includes the step of depositing molten glass in a blank mold and allowing it to flow into position within separate neck ring openings about neck pins therein, thereby to form a single blank having separate necks each with a cavity extending thereinto, thereafter inserting a cooling element into the glass in the mold thereby to partly divide the glass into separate portions joined to the respective necks and to increase the viscosity of those portions of the glass contacting with said element, then initially blowing the blank to simultaneously enlarge the cavities to produce a parison with a chilled hollow partition containing the cooling element, thereafter withdrawing said element from the partition to leave a recess, then transferring the initially shaped parison to a blow mold, and thereafter directing air under pressure simultaneously through all of the formed necks and into all of the cavities, thereby to collapse the recessed partition, give the glass its final shape and form separate non-communicating compartments opening into the respective necks.

5. The method of producing a multiple compartment container having a separate neck for each compartment, which includes the step of forcing glass into separate neck ring openings about neck pins therein to produce a single blank having separate spaced necks projecting therefrom and separate cavities extending into the respective necks, inserting a chilling element into the glass in the mold, thereafter expanding the blank within the mold and along the chilling element to provide a parison having enlarged cavities separated by a chilled partition, thereafter removing the chilling element to leave a recess in the partition, next transferring the initially shaped parison to a blow mold, and finally directing air under pressure through the separately formed necks into their respective cavities thereby to first simultaneously expand said cavities and then collapse the recess in the chilled partition to give the glass its final shape and form compartments in communication with the respective necks and separated by the partition.

6. The method of producing a multiple compartment, one-piece container having a separate neck for each compartment, which includes the step of forcing a single gob of glass into the separate neck ring openings about neck pins therein to form a single blank having spaced separate necks each with a cavity therein, subsequently compacting the glass in the mold and leveling its upper surface, thereafter directing a chilling element into the glass to form a recess dividing the glass into partly separated portions and to increase the viscosity of those portions in contact with the chilling element, then expanding the blank within the mold and along the chilling element to produce a parison, next withdrawing the chilling element from the recess formed thereby, then transferring the parison to a blow mold, and finally directing air under pressure through the separate formed necks, thereby to give the glass its final shape and form separate compartments in communication with the respective necks and at opposite sides of said recessed chilled portion.

7. The method of producing a multiple compartment container having a separate neck for each compartment, which includes the steps of depositing molten glass in a mold and forcing it into separate neck ring openings about neck pins therein, thereby to produce a single blank having separate spaced necks projecting therefrom and separate cavities within the respective necks, then compacting the glass in the mold and leveling its upper surface, thereafter simultaneously closing the mold with a baffle and forcing a chilling element into the glass to form a recess therein, subsequently expanding the blank within the mold and along the chilling element and against the baffle thereby to shape the blank into a parison having separate cavities separated by a partition in which said recess is located, the material of the partition being chilled by said element to increase its viscosity, and subsequently removing said element from the recess formed thereby and transferring the parison to a blow mold.

8. The method of producing a multiple compartment container having a separate neck for each compartment, which includes the steps of depositing molten glass in a mold and forcing it into separate neck ring openings about neck pins therein, thereby to produce a single blank having separate spaced necks projecting therefrom and separate cavities within the respective necks, then compacting the glass in the mold and leveling its upper surface, thereafter simultaneously closing the mold with a baffle and forcing a chilling element into the glass to form a recess in the glass, subsequently enlarging the cavities to expand the blank within the mold and along the chilling element and against the baffle thereby to shape the blank into a parison having separate cavities separated by a partition containing the chilling element, the material of the partition being chilled to increase its viscosity, subsequently removing the chilling element from the recess formed thereby, then transferring the parison to a blow mold, and finally directing air under pressure through the separately formed necks into the separate cavities, thereby to expand the blank within the blow mold and collapse and unify the recessed partition.

CHARLES B. GARWOOD.
WALTER R. SCHLEHR.